United States Patent

Sugahara

[15] 3,664,153
[45] May 23, 1972

[54] TORQUE TRANSMISSION ARRANGEMENT

[72] Inventor: Eisuke Sugahara, Tokyo, Japan
[73] Assignee: Nippon Piston Ring Kabushiki Kaisha, Tokyo, Japan
[22] Filed: Nov. 10, 1970
[21] Appl. No.: 88,321

[30] Foreign Application Priority Data

Dec. 29, 1969 Japan..................................45/1711
Dec. 29, 1969 Japan..................................45/1712

[52] U.S. Cl..................................................64/31, 64/19
[51] Int. Cl.........................................................F16d 3/04
[58] Field of Search............................................64/13, 19, 31

[56] References Cited

UNITED STATES PATENTS 3,242,694  3/1966  Schmidt....................................64/31
3,407,628  10/1968  Eccher.....................................64/31

FOREIGN PATENTS OR APPLICATIONS 601,557  12/1925  France....................................64/19
463,066  3/1937  Great Britain............................64/31

*Primary Examiner*—Kenneth W. Sprague
*Attorney*—Kelman & Berman

[57] ABSTRACT

Two shafts which are at least approximately parallel and rotate about transversely spaced axes connected by a torque transmission arrangement consisting of two axially spaced radial flanges on respective end portions of the shaft, three eccentric pins equiangularly distributed about the axis of each shaft and axially projecting from each flange toward the plane of rotation of the other flange, and three links of equal length hingedly connecting corresponding pins on the two flanges. When two such arrangements are connected in series by a flexible coupling between the two shafts, the shafts may be angularly misaligned by a small acute angle.

5 Claims, 5 Drawing Figures

PATENTED MAY 23 1972　　3,664,153

INVENTOR.
Eisuke Sugahara
BY Kelman and Berman
Agents

TORQUE TRANSMISSION ARRANGEMENT

This invention relates to torque transmission arrangements, and particularly to an arrangement for transmitting torque between two shafts whose axes of rotation are at least approximately parallel.

Gears are commonly employed for transmitting torque between shafts arranged in the afore-mentioned manner, but cause relatively great energy losses by friction unless carefully lubricated and otherwise maintained. Gears also are relatively costly to make. The same disadvantages are inherent in chain transmissions, and belt transmissions tend to slip.

An object of the invention is the provision of a torque transmission arrangement for the afore-mentioned purpose which does not cause significant energy losses even when not lubricated nor otherwise maintained, and which is less costly to build than a gear transmission, and not subject to slip in the manner of a belt transmission.

With these and other objects in view, as will hereinafter become apparent, the invention provides a transmission arrangement having an input member and an output member. The input member is driven by one of the shafts connected by the transmission, and the output member is mounted on the other shaft for rotation in a plane axially offset from the plane of rotation of the input member, the respective axes of rotation being at least approximately parallel and transversely spaced from each other.

Pin elements project axially from each member toward the plane of rotation of the other member. The pin elements on each member are angularly spaced about the axis of rotation of the member, and the number and axial spacing of the pin elements on the two members are equal. All elements on one member may thereby be aligned simultaneously with respective corresponding pin elements on the other member in the direction in which the axes of rotation are spaced. The input and output members are hingedly connected by link members which engage the aligned pin elements.

To compensate for angular misalignment of the shafts, another transmission arrangement substantially identical with that described above may be interposed between the drive shaft and the input member of the first-mentioned arrangement, and its output member coupled to the input member by a fixedly attached body of resilient material.

Other features and many of the attendant advantages of this invention will be appreciated readily as the same becomes better understood by reference to the following detailed description of preferred embodiments when considered in connection with the accompanying drawing wherein.

Figure 1:
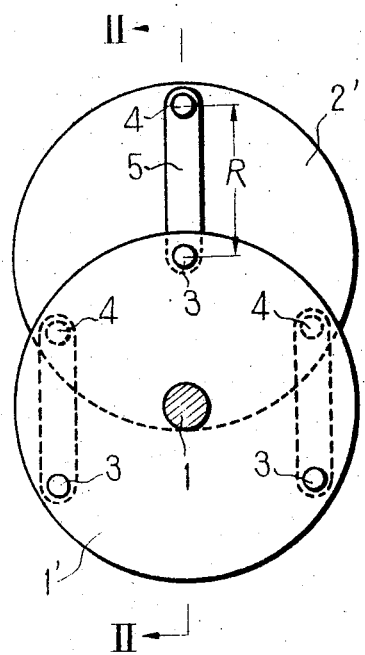
FIG. 1 shows a torque transmission arrangement of the invention in partly sectional front elevation.

Referring now to the drawing in detail, and initially to FIGS. 1 and 2, there are seen the ends of two shafts hereinafter referred to as the drive shaft 1 and the output shaft 2. The shafts 1, 2 are journaled in non-illustrated bearings of a supporting structure which holds the axes of rotation of the shaft parallel.

The input and output members of the transmission proper are two integral, radial flanges 1', 2' on the shaft ends which rotate with the associated shafts in respective axially offset planes. Three fixed pins 3 project from the input flange 1' toward the plane of rotation of the output flange 2'. The pins are eccentrically arranged along a common circle about the axis of rotation of the flange 1'.

In the position seen in the drawing, each pin 4 is aligned with a corresponding pin 3 in the direction in which the axes of the shafts 1, 2 are spaced from each other, and the corresponding pins are connected by three identical links 5 whose ends pivotally engage the pins. When the flange 1' is driven by the shaft 1, the torque is transmitted to the flange 2' by the pins 3, 4 and the links 5.

If so desired, either shaft may be swung about the other shaft in a circular arc of radius R equal to the spacing of the pivot axes of the pins 3, 4 associated with each link 5, without interfering with torque transmission between the shafts. It is further possible to move the shafts radially relative to each other and to maintain the functions of the transmission by merely varying the length of the connecting links.

Figures 2, 3:
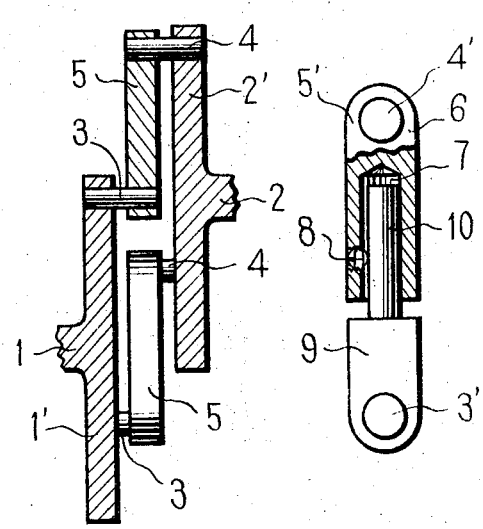
FIG. 2 illustrates the apparatus of FIG. 1 in section on the line II—II.
FIG. 3 shows a modified connecting link for the apparatus of FIG. 1 on a larger scale and partly in section.

While it is simple enough to exchange the links 5 for others of different length, it is preferred in such an arrangement to employ adjustable links 5' of the type shown in FIG. 3. Each link 5' has two longitudinal portions 6, 9. A fixed pin 4' transversely projects from the link portion 6 for pivotal engagement with a conforming opening in the flange 2'. A bore 7 extends longitudinally into the link portion 6 from the end remote from the pin 4'. A set screw 8 may be moved transversely into and out of the bore 7 through a threaded opening in the link portion 6.

One end of the link portion 9 carries a fixed pin 3' for pivotal engagement with an opening in the flange 1' and an integral, cylindrical rod 10 projects longitudinally from the other end of the link portion into the bore 7, and is adjustably fastened to the link portion 6 by the set screw 8.

When each of the three links 5 is replaced by a link 5' as shown in FIG. 3, the non-illustrated bearings of the shafts 1, 2 may be shifted radially toward and away from each other in addition to their angular adjustability as described above without replacement of parts in the transmission. It will be appreciated that the maximum length of the links 5, 5' is limited if it is desired to turn the shafts 1, 2 through angles of 360° or more because long links may collide with each other during rotation through an angle of more than approximately 120°.

While FIGS. 1 and 2 show pins 3, 4 fixed to respective flanges 1', 2' and movably received in the links 5, and FIG. 3 shows pins 3', 4' fixed on the links 5 and movably received in the flanges 1', 2', it will be appreciated that the two types of hinged connections may be interchanged without significant change in the function of the apparatus.

The flanges 1', 2' may be replaced in an obvious manner by three-armed spiders or rotatable input and output members of any other shape capable of supporting the pin elements in the desired distribution which need not be equiangular although the illustrated arrangement is preferred for reasons of balance. The number of links and of associated pin elements may be increased or decreased if so desired, but the angular spacing between two angularly consecutive pins 3, 4 should be smaller than 180°.

The afore-described torque transmission arrangement is particularly useful for coupling two shafts having transversely spaced axes, but it should be understood that the drive shaft 1 is merely illustrative of driving devices for rotating the input flange 1' about a first axis, and the output shaft 2 is representative of devices for mounting the output flange 2' for rotation about a second axis, other drive arrangements and mounting arrangements being obviously within the scope of the invention.

The apparatus illustrated in FIGS. 1 and 2 is extremely simple, yet capable of transmitting torque at minimal energy loss even when not lubricated or otherwise maintained. For severe service conditions, the materials of the movably engaged elements will be selected for minimal friction, and the pins 3, 4 may be received movably in bushings of suitable selected low-friction materials which may be inserted in the flanges 1', 2' or the links 5, 5' in the various pivot arrangements referred to above.

Figure 4:
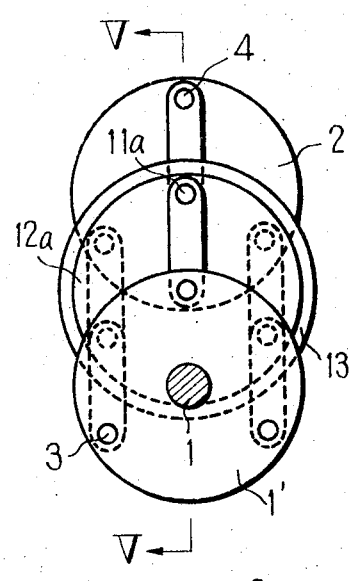
FIG. 4 shows a modified torque transmission arrangement including a flexible coupling in partly sectional front elevation.
Figure 5:
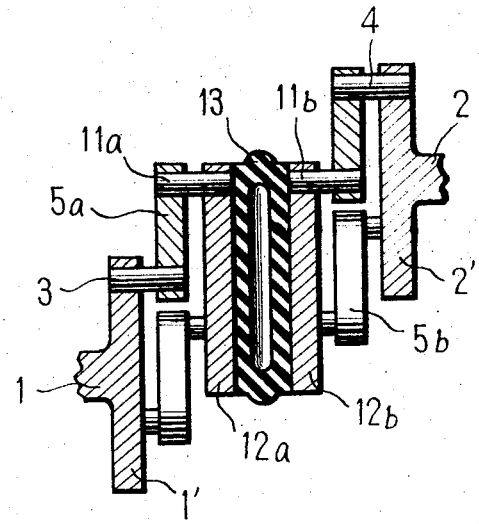
FIG. 5 illustrates the apparatus of FIG. 4 in section on the line V—V.

A small degree of misalignment between the axes of rotation of the flanges 1', 2' may be compensated for by increased clearances between the pins 3, 4 and the elements movably engaged by the pins, particularly if relatively small forces are to be transmitted. When a small acute angle of the axes of rotation cannot be tolerated in the apparatus of FIGS. 1 and 2, the more complex arrangement seen in FIGS. 4 and 5 is preferred.

As is shown in these FIGS. the output shaft 2 and the output flange 2' carry three pins 4 as described above. The drive shaft 1 similarly carries an input flange 1' provided with three eccentric axial pins 3.

The input and output portions of the torque transmission are connected by a flexible coupling essentially consisting of two rigid, circular discs 12a, 12b and a flat, resilient cushion 13 of approximately circular circumference arranged between the discs 12a, 12b. The cushion is hollow for better flexibility and directly vulcanized to respective flat faces of the discs. Three eccentric pins 11a project from the face of the disc 12a directed away from the cushion 13 and toward the plane of rotation of the flange 1' in equiangular distribution along a common circle equal in diameter to the circles which define the location of the pins 3 and 4. Three pins 11b similarly project from the disc 12b toward the plane of rotation of the output flange 2'. Links 5a connect the pins 3 and 11a, and links 5b connect the pins 4 and 11b so that the apparatus illustrated in FIGS. 4 and 5 essentially consists of two transmissions of the type described with reference to FIGS. 1 and 2 arranged in series and connected by the flexible cushion 13.

The pins 11a, 11b on the discs 12a, 12b have been shown longitudinally aligned for the convenience of pictorial representation only, and the discs 12, 12b may be mounted in any desired angular relationship of the associated pins 11a, 11b. The discs 12a, 12b need not be parallel, and their opposite faces may enclose a small acute angle, for example, of 8°, when the axes of rotation of the shafts 1, 2 are misaligned by an equal angle. The cushion 13 is deformed into a wedge shape between the discs when the shaft axes are angularly misaligned, and the narrow end of the wedge travels about the circumference of the cushion when the shafts rotate, as will be obvious. A solid disc of elastomeric material may replace the hollow cushion 13 for less severe requirements.

The discs 12a, 12b may be replaced by rotating elements of different shape without change in the operation of the device, substantially as discussed above with reference to the flanges 1', 2'. It is not necessary that the faces of the discs 12a, 12b engaging the cushion 13 be flat, and a more irregular shape may provide better bonding with a conformingly shaped cushion.

Other modifications and variations of the present invention may obviously be resorted to by those skilled in the art without departing from the spirit and scope of the invention as hereinafter defined by the appended claims, as only preferred embodiments thereof have been disclosed.

What is claimed is:

1. A torque transmission arrangement comprising, in combination:
   a. a first input member and a first output member,
   b. drive means for rotating said first input member in a first plane about a first axis;
   c. mounting means mounting said first output member for rotation in a second plane axially offset from said first plane about a second axis approximately parallel to said first axis and spaced from said first axis in a direction transverse of said axes;
   d. a first plurality of pin elements projecting axially from each of said first members toward the plane of rotation of the other first member;
      1. the pin elements on each first member being angularly spaced about the axis of rotation of the member,
      2. the number and angular distribution of the pin elements on one first member being equal to the number and angular distribution of the pin elements on the other first member, whereby each pin element on one first member may be aligned in said direction with a corresponding pin element on the other first member;
   e. first link means hingedly connecting said first members,
      1. said link means including a plurality of first link members respectively associated with the pin elements on each of said first members,
      2. respective portions of each link member engaging two aligned pin elements,
      3. said drive means including
         i. a second input member and a second output member;
         ii. actuating means for rotating said second input member about a third axis in a third plane;
         iii. a body of resilient material axially interposed between said second output member and said first input member and coupling said first input member to said second output member for rotation about said second axis when said second output member rotates about a fourth axis approximately parallel to said second axis and said third axis while permitting limited relative angular displacement of said second and fourth axes;
   f. a second plurality of pin elements projecting from each of said second members toward the other second member,
      1. the pin elements on each second member being angularly spaced about the axis of rotation of the member, the number and angular distribution of the pin elements on each second member being equal to the number and angular distribution of the pin elements on the other second member, whereby each pin element on one second member may be aligned in a predetermined direction with a corresponding pin element on the other second member,
      2. said third and fourth axes being spaced in said predetermined direction; and
   g. second link means hingedly connecting said second members, said second link means including a plurality of second link members respectively associated with the pin elements on each of said second members, respective portions of each second link member engaging two aligned pin elements on said second members.

2. An arrangement as set forth in claim 1, wherein the angular spacing of two angularly consecutive pin elements on each first member is less than 180°.

3. An arrangement as set forth in claim 1, further comprising means for varying the length of each of said first link members.

4. An arrangement as set forth in claim 1, wherein said second output member and said first input member are rigid.

5. An arrangement as set forth in claim 4, wherein said second output member and said first-mentioned input member have respective, opposite faces, said body being interposed between said faces and fixedly fastened to each face.

* * * * *